United States Patent
Zhu et al.

(10) Patent No.: US 11,912,818 B2
(45) Date of Patent: Feb. 27, 2024

(54) METHOD FOR SYNTHESIZING AROMATIC-ALIPHATIC COPOLYESTER WITHOUT CATALYST AND PRODUCT THEREOF

(71) Applicant: ZHEJIANG UNIVERSITY, Hangzhou (CN)

(72) Inventors: Weipu Zhu, Hangzhou (CN); Qiuquan Cai, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/270,723

(22) PCT Filed: Dec. 27, 2021

(86) PCT No.: PCT/CN2021/141433
§ 371 (c)(1),
(2) Date: Jun. 30, 2023

(87) PCT Pub. No.: WO2022/148259
PCT Pub. Date: Jul. 14, 2022

(65) Prior Publication Data
US 2023/0391948 A1    Dec. 7, 2023

(30) Foreign Application Priority Data

Jan. 5, 2021 (CN) .......................... 202110007945.6

(51) Int. Cl.
| | |
|---|---|
| *C08G 63/183* | (2006.01) |
| *C08G 63/672* | (2006.01) |
| *C08G 63/676* | (2006.01) |
| *C08G 63/685* | (2006.01) |
| *C08G 63/78* | (2006.01) |

(52) U.S. Cl.
CPC ......... *C08G 63/183* (2013.01); *C08G 63/672* (2013.01); *C08G 63/676* (2013.01); *C08G 63/6856* (2013.01); *C08G 63/78* (2013.01)

(58) Field of Classification Search
USPC ........................................ 528/271, 273, 289
See application file for complete search history.

(56) References Cited

U.S. PATENT DOCUMENTS

| 4,314,051 A | 2/1982 | Berger et al. |
| 5,164,478 A | 11/1992 | Lee et al. |

FOREIGN PATENT DOCUMENTS

| CN | 101374883 | 2/2009 |
| CN | 110790906 | 2/2020 |
| CN | 111978528 | 11/2020 |

*Primary Examiner* — Terressa Boykin
(74) *Attorney, Agent, or Firm* — Jiwen Chen; Joywin IP Law PLLC

(57) ABSTRACT

The present invention discloses a method for synthesizing an aromatic-aliphatic copolyester without a catalyst and a product thereof. The method includes: a prepolymerization stage: under the condition of not adding a catalyst, subjecting raw materials including an aromatic dicarboxylic acid, a dihydric alcohol and a cyclic dicarboxylic acid or a corresponding anhydride thereof to an esterification reaction to obtain a carboxyl-terminated prepolymer, where the total molar amount of the dicarboxylic acids is greater than the molar amount of the dihydric alcohol; and a polymerization stage: under the condition of reduced pressure, removing the anhydride corresponding to the cyclic dicarboxylic acid from the carboxyl-terminated prepolymer at a reaction temperature not lower than the boiling point of the anhydride corresponding to the cyclic dicarboxylic acid to obtain an aromatic-aliphatic copolyester. According to the method of the present invention, the aromatic-aliphatic copolyester without a catalyst can be prepared, so that the problems of biological toxicity, accelerated aging, shortened storage time and service life and the like caused by a catalyst residue can be avoided. Meanwhile, the aromatic-aliphatic copolyester has degradability, so that the current environmental protection pressure is reduced.

7 Claims, 2 Drawing Sheets

METHOD FOR SYNTHESIZING AROMATIC-ALIPHATIC COPOLYESTER WITHOUT CATALYST AND PRODUCT THEREOF

This is a U.S. national stage application of PCT Application No. PCT/CN2021/141433 under 35 U.S.C. 371, filed Dec. 27, 2021 in Chinese, claiming priority of Chinese Application No. 202110007945.6, filed Jan. 5, 2021, all of which are hereby incorporated by reference.

FIELD OF TECHNOLOGY

The present invention relates to the technical field of synthesis of polymer materials, and in particular to a method for synthesizing an aromatic-aliphatic copolyester without a catalyst and a product thereof.

BACKGROUND TECHNOLOGY

As common polymer materials containing ester bonds in molecular repeating units, polyesters have been widely used in daily life, such as fabrics, agricultural films, food and beverage packaging, medical apparatus and instruments and other fields. According to different chemical compositions, the polyesters can be divided into aromatic polyesters, aliphatic polyesters and aromatic-aliphatic copolyesters. Since molecular chains of the aromatic polyesters contain rigid aromatic ring structures, the aromatic polyesters have good mechanical properties and thermal stability, but are generally not degradable. Since molecular chains of the aliphatic polyesters have good flexibility, the aliphatic polyesters are easy to mold and process and have degradability. However, the aromatic-aliphatic copolyesters have the advantages of the fore-mentioned two substances. Meanwhile, by adjusting monomer compositions of the copolyesters, physicochemical properties of the copolyesters can be conveniently adjusted, and mechanical properties and processing and molding properties of the copolyesters can be improved.

Existing methods for synthesizing the copolyesters usually include a two-step melting and condensation polymerization method in the presence of a catalyst, and the method specifically includes two stages including esterification and transesterification. For example, according to the Chinese patent CN1300213C, a biodegradable ternary copolyester and a preparation method thereof are disclosed, and the ternary copolyester is obtained by random copolymerization of a polybutylene succinate raw material, polyethylene succinate or polyhexane succinate or polybutylene adipate or polyhexane adipate, and polyethylene terephthalate or polybutylene terephthalate or polytrimethylene terephthalate. Tetrabutyl titanate, isobutyl titanate, antimony trioxide, tetrabutyl germanate and toluenesulfonic acid are added as catalysts. According to the Chinese patent CN102718955B, a poly(ethylene terephthalate-co-glycolate) copolyester and a preparation method thereof are disclosed. According to the method, catalysts containing zinc, antimony, tin, titanium, aluminum and calcium are required. For another example, according to the Chinese patents CN111100272A, CN102477149A, CN111100270A and CN102660008B, degradable aliphatic-aromatic copolyesters are disclosed, and conventional esterification and transesterification catalysts are required to be added in synthesis processes. However, after the catalysts are used, occurrence of side reactions is increased, and aging of polyester products is also accelerated, so that the storage time and the service life are shortened. Meanwhile, most of the catalysts are toxic heavy metal catalysts and slowly leak out during use, thus endangering the human health and causing environmental pollution.

SUMMARY OF THE INVENTION

The present invention provides a method for synthesizing an aromatic-aliphatic copolyester without a catalyst. The aromatic-aliphatic copolyester without any catalyst can be prepared and safely applied in food contact materials, medical materials and other fields in close contact with the human body. Moreover, due to degradability of the copolyester, the current environmental protection pressure can also be further reduced.

Specific technical solutions are as follows.

A method for synthesizing an aromatic-aliphatic copolyester without a catalyst comprises:
 a prepolymerization stage: under the condition of not adding a catalyst, subjecting raw materials comprising an aromatic dicarboxylic acid, a dihydric alcohol and a cyclic dicarboxylic acid or a corresponding anhydride thereof to an esterification reaction to obtain a carboxyl-terminated prepolymer, where the total molar amount of the dicarboxylic acids is greater than the molar amount of the dihydric alcohol; and
 a polymerization stage: under the condition of reduced pressure, removing the anhydride corresponding to the cyclic dicarboxylic acid from the carboxyl-terminated prepolymer at a reaction temperature not lower than the boiling point of the anhydride corresponding to the cyclic dicarboxylic acid to obtain an aromatic-aliphatic copolyester.

According to the principle of the present invention, a certain proportion of the cyclic dicarboxylic acid monomer is positioned at a terminal end of a polyester polymer chain, and the alcohol-acid ratio is spontaneously adjusted during polymerization by means of the properties of autocatalysis and anhydride formation of such monomer, so as to obtain the aromatic-aliphatic copolyester without adding any catalyst.

In the prepolymerization stage, the aliphatic dicarboxylic acid can also be added. The cyclic dicarboxylic acid may be aliphatic or may have a benzene ring, such as phthalic acid and the like.

In the prepolymerization stage, the aromatic dicarboxylic acid may be selected from at least one of terephthalic acid, isophthalic acid, 2,2'-biphenyldicarboxylic acid, 4,4'-biphenyldicarboxylic acid, 2,5-furandicarboxylic acid, 2,5-thiophenedicarboxylic acid, 2,5-pyridinedicarboxylic acid, 2,6-naphthalenedicarboxylic acid, 1,4-naphthalenedicarboxylic acid and [2,2'-bipyridine]-4,4'-dicarboxylic acid;
 the cyclic dicarboxylic acid is a dicarboxylic acid capable of forming a five-membered or six-membered cyclic anhydride easily and is specifically selected from at least one of succinic acid, 2-methylsuccinic acid, 2-phenylsuccinic acid, 2-benzylsuccinic acid, 2,2-dimethylsuccinic acid, 2,3-dimethylsuccinic acid, 2,3-diphenylsuccinic acid, 1,2-cyclosuccinic acid, 2,2,3,3-tetramethylsuccinic acid, maleic acid, phthalic acid, glutaric acid, 2-ketoglutaric acid, 1,3-acetonedicarboxylic acid, 2-methylglutaric acid, 3-methylglutaric acid, 3-phenylglutaric acid, 2,2-dimethylglutaric acid, 3,3-dimethylglutaric acid, 3-ethyl-3-methylglutaric acid, 3,3-tetramethyleneglutaric acid and diglycolic acid;
 the anhydride is selected from anhydrides corresponding to the cyclic dicarboxylic acid and is specifically selected from at least one of succinic anhydride, 2-methylsuccinic anhydride, 2-phenylsuccinic anhydride, 2-benzylsuccinic anhydride, 2,2-dimethylsuccinic anhydride, 2,3-dimethylsuccinic anhydride, 2,3-diphenylsuccinic anhydride, 1,2-cyclosuccinic anhydride, 2,2,3,3-tetramethylsuccinic anhydride, maleic anhydride, phthalic anhydride, glutaric anhydride, 2-ketoglutaric anhydride, 1,3-acetonedicarboxylic anhydride, 2-methylglutaric anhydride, 3-methylglutaric anhydride, 3-phenylglutaric anhydride, 2,2-dimethylglutaric anhydride, 3,3-dimethylglutaric anhydride, 3-ethyl-3-methylglutaric anhydride, 3,3-tetramethyleneglutaric anhydride and diglycolic anhydride;

and the dihydric alcohol may be selected from at least one of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, neopentyl glycol, N-methyldiethanolamine, diethylene glycol, polyethylene glycol and polypropylene glycol.

Preferably, the total molar ratio of the dicarboxylic acids to the dihydric alcohol is 1.01:1 to 2:1, and the molar ratio of the aromatic dicarboxylic acid to the dihydric alcohol is (0.001-0.899):1.

Preferably, in the prepolymerization stage, the esterification reaction is carried out at a temperature of 150-280° C. and a pressure of 0.1-10 MPa for 2-24 hours.

In the polymerization stage, under the condition of reduced pressure, the cyclic dicarboxylic acid-terminated prepolymer forms an anhydride by means of "back biting" at a terminal end of a molecular chain and then is evaporated and released out at a reaction temperature not lower than the boiling point of the anhydride corresponding to the cyclic dicarboxylic acid, and the system spontaneously reaches the condition of an equal alcohol-acid molar ratio required to increase the molecular weight, so as to obtain the aromatic-aliphatic copolyester without a catalyst.

Preferably, in the polymerization stage, a reaction is carried out at a temperature of 240-300° C. and a pressure lower than 100 MPa for 5-48 hours.

The present invention further discloses an aromatic-aliphatic copolyester without any catalyst prepared by the above synthesis method, and the molecular weight of the copolyester can reach more than 25 kDa.

Compared with the prior art, the present invention has the following outstanding advantages.
(1) Compared with existing methods for synthesizing aromatic-aliphatic copolyesters, the synthesis method of the present invention is free of any catalyst, and the problems of biological toxicity, accelerated aging, shortened storage time and service life and the like caused by a catalyst residue can be avoided.
(2) The aromatic-aliphatic copolyester product synthesized by the present invention has high purity and can be safely applied in food contact materials, medical materials and other fields in close contact with the human body.
(3) The aromatic-aliphatic copolyester synthesized by the present invention has degradability, so that the environmental pressure is reduced.

DESCRIPTION OF THE EMBODIMENTS

The present invention is further described below in combination with specific embodiments and attached drawings, but the present invention is not limited to the following embodiments.

The purpose is merely to make the present invention better understood, rather than to limit the protection scope of the present invention.

Example 1

Prepolymerization stage: 42.82 g of terephthalic acid (PTA), 11.42 g of succinic acid (SA) and 20.00 g of ethylene glycol were added into a 250 mL three-mouth flask, where the feeding molar ratio of the terephthalic acid to the succinic acid to the ethylene glycol was 0.8:0.3:1. The above substances were heated to 200° C. under a pressurization condition of 0.4 MPa to carry out an esterification reaction, and water produced by the reaction was discharged by a condensate reflux device, where the reaction was carried out for 5 hours. After the reaction was completed, a certain proportion of a succinic acid-terminated prepolymer was obtained. According to a $^1$H NMR test, the molar ratio of the terephthalic acid unit to the succinic acid unit to the ethylene glycol unit in the prepolymer is 0.63:0.43:1.

Polymerization stage: The prepolymer was transferred to a polymerization device, vacuumization was conducted to reduce the pressure to lower than 100 Pa, and then a reaction was carried out at a temperature of 260° C. for 10 hours. After the reaction was completed, a test was carried out. A resulting product has a characteristic viscosity of 0.67 dL/g and a viscosity-average molecular weight of 28,800 Da. According to a $^1$H NMR test, the molar ratio of the terephthalic acid unit to the succinic acid unit to the ethylene glycol unit in the poly(ethylene terephthalate-co-ethylene succinate) product prepared in this example is 0.8:0.2:1.

Figure 1:
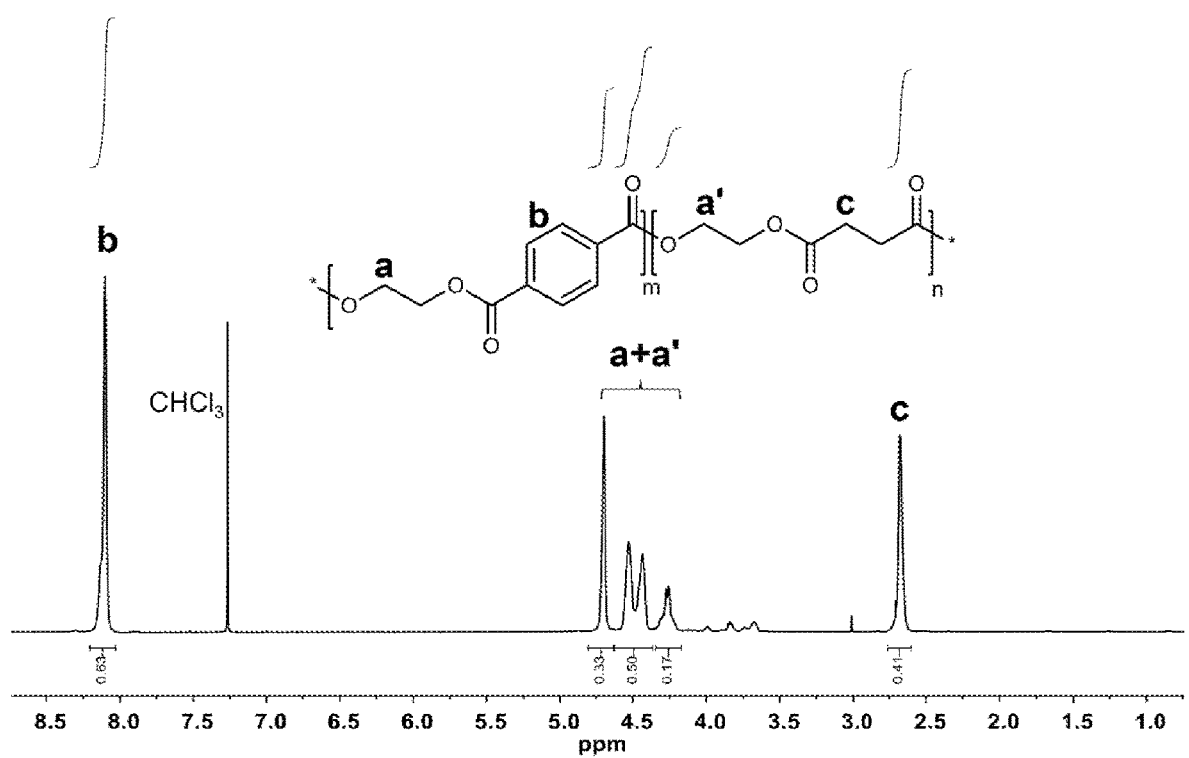
FIG. 1 is a $^1$H NMR diagram of a poly(ethylene terephthalate-co-ethylene succinate) prepolymer in Example 1.

FIG. 1 is a $^1$H NMR diagram of the prepolymer prepared in the prepolymerization stage in this example. The figure shows that the total molar amount of the terephthalic acid unit and the succinic acid unit in the prepolymer is greater than the molar amount of the ethylene glycol unit.

Figure 2:
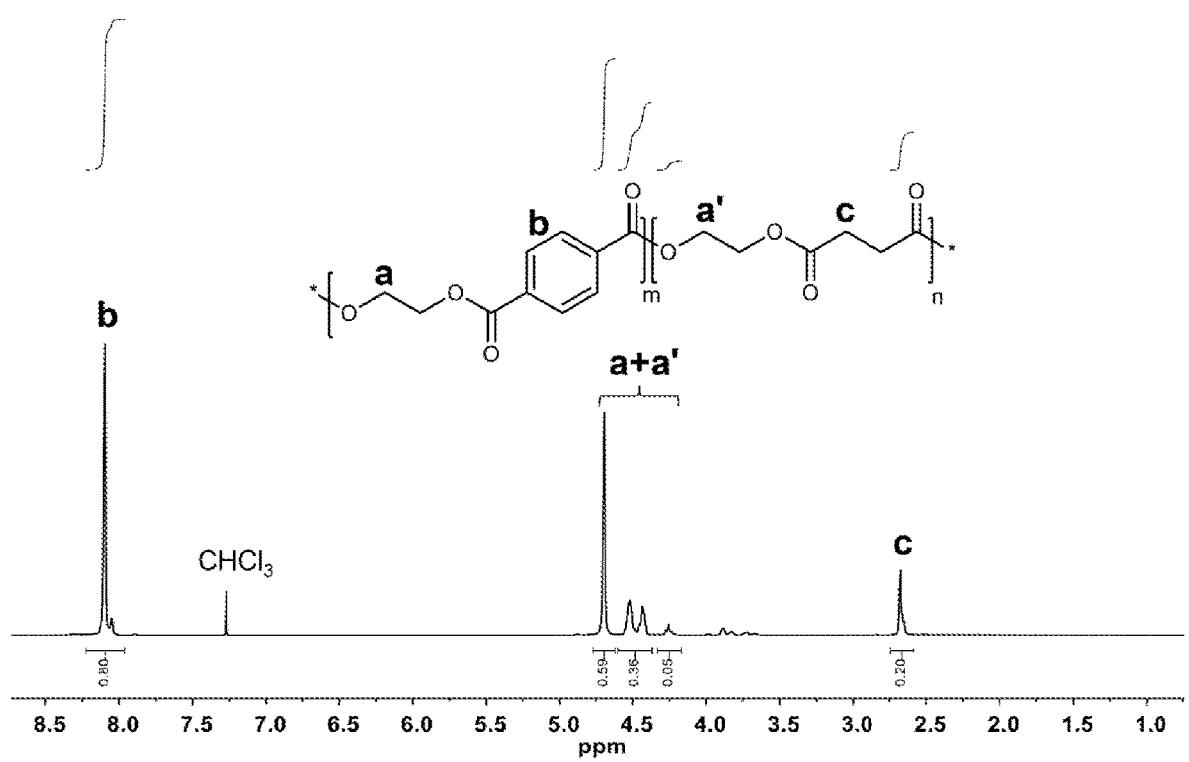
FIG. 2 is a $^1$H NMR diagram of a poly(ethylene terephthalate-co-ethylene succinate) product prepared in Example 1.

FIG. 2 is a $^1$H NMR diagram of the poly(ethylene terephthalate-co-ethylene succinate) product prepared this example. It is indicated that the composition molar ratio of dicarboxylic acids to a dihydric alcohol in the final product is 1:1. Therefore, conditions for obtaining a high-molecular-weight copolyester are met.

Examples 2-4

The synthesis process is the same as that in Example 1, and is only different in that the feeding molar ratio of the terephthalic acid to the succinic acid to the ethylene glycol was separately changed into 0.2:0.9:1, 0.3:0.8:1 and 0.5:0.6:1

According to a test, a copolyester product obtained in Example 2 has a characteristic viscosity of 0.77 dL/g and a viscosity-average molecular weight of 47,900 Da.

A copolyester product obtained in Example 3 has a characteristic viscosity of 0.65 dL/g and a viscosity-average molecular weight of 38,200 Da.

A copolyester product obtained in Example 4 has a characteristic viscosity of 0.62 dL/g and a viscosity-average molecular weight of 25,900 Da.

Example 5

The synthesis process is the same as that in Example 1, and is only different in that the reaction temperature in the prepolymerization stage was changed into 240° C.

According to a test, a copolyester product obtained in Example 5 has a characteristic viscosity of 0.69 dL/g and a viscosity-average molecular weight of 30,000 Da.

Example 6

The synthesis process is the same as that in Example 1, and is only different in that the reaction temperature in the prepolymerization stage was changed into 260° C.

According to a test, a copolyester product obtained in Example 6 has a characteristic viscosity of 0.71 dL/g and a viscosity-average molecular weight of 31,200 Da.

Example 7

The synthesis process is the same as that in Example 1, and is only different in that the reaction time in the prepolymerization stage was changed into 12 hours.

According to a test, a copolyester product obtained in Example 7 has a characteristic viscosity of 0.68 dL/g and a viscosity-average molecular weight of 29,400 Da.

Example 8

The synthesis process is the same as that in Example 1, and is only different in that the reaction time in the prepolymerization stage was changed into 24 hours.

According to a test, a copolyester product obtained in Example 8 has a characteristic viscosity of 0.75 dL/g and a viscosity-average molecular weight of 33,600 Da.

Examples 9-12

The synthesis process is the same as that in Example 1, and is only different in that the succinic acid was separately changed into 2-methylsuccinic acid, 2,2-dimethylsuccinic acid, glutaric acid and diglycolic acid.

According to a test, a copolyester product obtained in Example 9 has a characteristic viscosity of 0.66 dL/g and a viscosity-average molecular weight of 28,200 Da.

A copolyester product obtained in Example 10 has a characteristic viscosity of 0.67 dL/g and a viscosity-average molecular weight of 28,800 Da.

A copolyester product obtained in Example 11 has a characteristic viscosity of 0.70 dL/g and a viscosity-average molecular weight of 30,600 Da.

A copolyester product obtained in Example 12 has a characteristic viscosity of 0.64 dL/g and a viscosity-average molecular weight of 27,100 Da.

Examples 13-14

The synthesis process is the same as that in Example 1, and is only different in that the terephthalic acid was separately changed into 2,5-furandicarboxylic acid and 2,5-pyridinedicarboxylic acid.

According to a test, a copolyester product obtained in Example 13 has a characteristic viscosity of 0.55 dL/g and a viscosity-average molecular weight of 22,000 Da.

A copolyester product obtained in Example 14 has a characteristic viscosity of 0.59 dL/g and a viscosity-average molecular weight of 24,200 Da.

Example 15

The synthesis process is the same as that in Example 1, and is only different in that the succinic acid was changed into succinic anhydride.

According to a test, a copolyester product obtained in Example 15 has a characteristic viscosity of 0.65 dL/g and a viscosity-average molecular weight of 27,600 Da.

Examples 16-17

The synthesis process is the same as that in Example 1, and is only different in that the ethylene glycol was separately changed into 1,4-butanediol and 1,10-decanediol.

According to a test, a copolyester product obtained in Example 16 has a characteristic viscosity of 0.57 dL/g and a viscosity-average molecular weight of 23,100 Da.

A copolyester product obtained in Example 17 has a characteristic viscosity of 0.73 dL/g and a viscosity-average molecular weight of 32,400 Da.

Example 18

The synthesis process is the same as that in Example 1, and is only different in that the reaction conditions in the polymerization stage were changed, where the reaction was carried out at a temperature of 280° C. for 10 hours.

According to a test, a copolyester product obtained in Example 18 has a characteristic viscosity of 0.72 dL/g and a viscosity-average molecular weight of 31,800 Da.

Example 19

The synthesis process is the same as that in Example 1, and is only different in that the reaction conditions in the polymerization stage were changed, where the reaction was carried out at a temperature of 280° C. for 16 hours.

According to a test, a copolyester product obtained in Example 19 has a characteristic viscosity of 0.74 dL/g and a viscosity-average molecular weight of 33,000 Da.

In addition, it should be understood that after reading the above descriptions of the contents of the present invention, persons skilled in the art may make various alterations or modifications to the present invention, and such equivalent forms also fall within the scope limited by the claims attached to this application.

What is claimed is:

1. A method for synthesizing an aromatic-aliphatic copolyester without a catalyst, comprising:
   a prepolymerization stage: under the condition of not adding a catalyst, subjecting raw materials comprising an aromatic dicarboxylic acid, a dihydric alcohol and a cyclic dicarboxylic acid or a corresponding anhydride thereof to an esterification reaction to obtain a carboxyl-terminated prepolymer, wherein the total molar amount of the dicarboxylic acids is greater than the molar amount of the dihydric alcohol, the molar ratio of the aromatic dicarboxylic acid to the dihydric alcohol is (0.001-0.899):1, the cyclic dicarboxylic acid is a dicarboxylic acid capable of forming a cyclic anhydride easily and is specifically selected from at least one of succinic acid, 2-methylsuccinic acid, 2-phenylsuccinic acid, 2-benzylsuccinic acid, 2,2-dimethylsuccinic acid, 2,3-dimethylsuccinic acid, 2,3-diphenylsuccinic acid, 1,2-cyclosuccinic acid, 2,2,3,3-tetramethylsuccinic acid, maleic acid, phthalic acid, glutaric acid, 2-ketoglutaric acid, 1,3-acetonedicarboxylic acid, 2-methylglutaric acid, 3-methylglutaric acid, 3-phenylglutaric acid, 2,2-dimethylglutaric acid, 3,3-dimethylglutaric acid, 3-ethyl-3-methylglutaric acid, 3,3-tetramethyleneglutaric acid and diglycolic acid;

and the anhydride is selected from anhydrides corresponding to the cyclic dicarboxylic acid and is specifically selected from at least one of succinic anhydride, 2-methylsuccinic anhydride, 2-phenylsuccinic anhydride, 2-benzylsuccinic anhydride, 2,2-dimethylsuccinic anhydride, 2,3-dimethylsuccinic anhydride, 2,3-diphenylsuccinic anhydride, 1,2-cyclosuccinic anhydride, 2,2,3,3-tetramethylsuccinic anhydride, maleic anhydride, phthalic anhydride, glutaric anhydride, 2-ketoglutaric anhydride, 1,3-acetonedicarboxylic anhydride, 2-methylglutaric anhydride, 3-methylglutaric anhydride, 3-phenylglutaric anhydride, 2,2-dimethylglutaric anhydride, 3,3-dimethylglutaric anhydride, 3-ethyl-3-methylglutaric anhydride, 3,3-tetramethyleneglutaric anhydride and diglycolic anhydride; and a polymerization stage: under the condition of reduced pressure, removing the anhydride corresponding to the cyclic dicarboxylic acid from the carboxyl-terminated prepolymer at a reaction temperature not lower than the boiling point of the anhydride corresponding to the cyclic dicarboxylic acid to obtain an aromatic-aliphatic copolyester.

2. The method for synthesizing an aromatic-aliphatic copolyester without a catalyst according to claim 1, wherein the aromatic dicarboxylic acid is selected from at least one of terephthalic acid, isophthalic acid, 2,2'-biphenyldicarboxylic acid, 4,4'-biphenyldicarboxylic acid, 2,5-furandicarboxylic acid, 2,5-thiophenedicarboxylic acid, 2,5-pyridinedicarboxylic acid, 2,6-naphthalenedicarboxylic acid, 1,4-naphthalenedicarboxylic acid and [2,2'-bipyridine]-4,4'-dicarboxylic acid.

3. The method for synthesizing an aromatic-aliphatic copolyester without a catalyst according to claim 1, wherein the dihydric alcohol is selected from at least one of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, neopentyl glycol, N-methyldiethanolamine, diethylene glycol, polyethylene glycol and polypropylene glycol.

4. The method for synthesizing an aromatic-aliphatic copolyester without a catalyst according to claim 1, wherein the total molar ratio of the dicarboxylic acids to the dihydric alcohol is 1.01:1 to 2:1.

5. The method for synthesizing an aromatic-aliphatic copolyester without a catalyst according to claim 1, wherein in the prepolymerization stage, the esterification reaction is carried out at a temperature of 150-280° C. and a pressure of 0.1-10 MPa for 2-24 hours.

6. The method for synthesizing an aromatic-aliphatic copolyester without a catalyst according to claim 1, wherein in the polymerization stage, a reaction is carried out at a temperature of 240-300° C. and a pressure lower than 100 MPa for 5-48 hours.

7. An aromatic-aliphatic copolyester without a catalyst synthesized by the method according to claim 1.

* * * * *